United States Patent [19]

Koide et al.

[11] Patent Number: 5,366,531
[45] Date of Patent: Nov. 22, 1994

[54] PREPARATION OF A PREFORM OF OPTICAL FIBERS

[75] Inventors: Hiroyuki Koide; Hitoshi Iinuma; Hideo Hirasawa, all of Gunma, Japan

[73] Assignee: Shin-Etsu Chemical Co., Ltd., Tokyo, Japan

[21] Appl. No.: 131,450

[22] Filed: Oct. 4, 1993

[30] Foreign Application Priority Data

Oct. 21, 1992 [JP] Japan .................................. 4-307532

[51] Int. Cl.$^5$ .......................................... C03B 37/023
[52] U.S. Cl. ........................................ 65/415; 65/17.4
[58] Field of Search ............................ 65/3.12, 18.2, 2

[56] References Cited

U.S. PATENT DOCUMENTS 4,618,354 10/1986 Suda et al. .................................. 65/2
4,826,520 5/1989 Kawazoe et al. ...................... 65/3.12

*Primary Examiner*—Robert L. Lindsay

*Attorney, Agent, or Firm*—McAulay Fisher Nissen Goldberg & Kiel

[57] ABSTRACT

An improvement is proposed in the method for the flame hydrolysis of a silicon-containing gas, e.g., silicon tetrachloride, to produce fine silica particles to be deposited on a substrate in a process for the preparation of a silica glass preform of optical fibers by using a fivefold concentric multiplex-tube burner nozzle. In contrast to the conventional way for the flame hydrolysis in which the center or first nozzle opening of the burner serves for ejection of a mixture of silicon tetrachloride and oxygen and hydrogen is ejected from the third nozzle opening while argon is ejected from the second nozzle opening inbetween, the gas ejected from the second nozzle opening is, instead of argon alone, a mixture of oxygen and argon in a specified mixing proportion so that deposition of silica particles on the nozzle end can be prevented even when the feed rate of silicon tetrachloride is relatively high.

4 Claims, No Drawings

PREPARATION OF A PREFORM OF OPTICAL FIBERS

BACKGROUND OF THE INVENTION

The present invention relates to an improvement in the method for the preparation of a preform of optical fibers or, more particularly, to an improvement in the method for the preparation of a glassy preform of optical fibers by the deposition of fine silica particles formed by the flame-hydrolysis of a silicon-containing starting material for the glass in an oxyhydrogen flame.

As is known, a preform of optical fibers of, for example, fused silica glass is prepared by the deposition of silica soot or fine particles of silica, formed by the combustion of a silicon-containing starting gas such as silicon tetrachloride which is introduced into a concentric multiplex-tube burner nozzle together with oxygen gas and hydrogen gas to form an oxyhydrogen flame in which the silicon-containing starting gas is flame-hydrolyzed and converted into silica particles, on a substrate body of, for example, synthetic fused silica glass to form a porous body of silica followed by subsequent heating and vitrification of the porous body at a high temperature into a transparent silica glass preform. This process is called the outer-deposition CVD method or VAD method.

The concentric multiplex-tube burner nozzle used here has several nozzle openings including the center nozzle opening and a plural number of ring-wise nozzle openings from which the silicon-containing starting gas for the glass material, inert diluent gas, hydrogen gas and oxygen gas are ejected either separately or as a mixture to cause burning of an oxyhydrogen flame and flame hydrolysis of the starting gas for the glass material in the flame. One of the serious problems encountered in the continuous running of this flame-hydrolysis reaction is that the nozzle end of the burner is sometimes overheated by the oxyhydrogen flame resulting in premature damage or deformation of the burner nozzle if not to mention the problem that the fine silica particles produced from the silicon-containing starting gas by the flame hydrolysis are deposited more or less on the nozzle end of the burner eventually resulting in blocking of the nozzle openings by the growth of the silica particle deposition.

In view of the above mentioned problems, an improved method is disclosed in Japanese Patent Publication No. 61-44822, according to which an inert gas is ejected from a ring-wise nozzle opening of a concentric multiplex-tube burner nozzle which is between two nozzle openings, one, for the ejection of hydrogen gas or a mixture of a silicon-containing gas and hydrogen gas and, the other, for the ejection of oxygen gas. This method, however, has a practical disadvantage that the efficiency of combustion to form an oxyhydrogen flame cannot be high enough because, when the rate of ejection of the silicon-containing starting gas is increased with an object to improve the productivity, the flow rate of the inert gas also must be increased correspondingly since otherwise the nozzle openings are readily blocked by the rapid deposition of silica particles thereon. This problem of silica particle deposition on the nozzle end can be partly solved by providing an intermediate nozzle opening for the ejection of an inert gas between two nozzle openings, one, for the ejection of a mixture of oxygen and the silicon-containing starting gas and, the other, for the ejection of hydrogen gas though at the sacrifice of the efficiency of the reaction to cause a decrease in the effective yield of silica deposition on the substrate.

SUMMARY OF THE INVENTION

The present invention accordingly has an object to provide an improvement, by which the above described problems and disadvantages can be overcome in the method for the preparation of a glassy preform of optical fibers comprising combustion of a silicon-containing starting gas in an oxyhydrogen flame formed from hydrogen gas and oxygen gas by using a concentric multiplex-nozzle burner to effect flame hydrolysis of the silicon-containing starting gas in the oxyhydrogen flame to form fine silica particles, deposition of the fine silica particles on a substrate to form a porous silica body and vitrification of the porous silica body by heating into a transparent glassy preform of optical fibers.

Thus, the present invention provides, in a method for the preparation of a glassy preform of optical fibers comprising the steps of combustion of a silicon-containing starting gas in an oxyhydrogen flame formed from hydrogen gas and oxygen gas by using a multiplex-tube burner nozzle having five concentrically arranged nozzle openings to effect flame hydrolysis of the silicon-containing starting gas in the oxyhydrogen flame to form fine silica particles, deposition of the fine silica particles on a substrate to form a porous silica body and vitrification of the porous silica body by heating into a transparent glassy preform of optical fibers, an improvement which comprises ejecting a gaseous mixture of the silicon-containing starting gas and oxygen gas from one of the nozzle openings, ejecting hydrogen gas from another of the nozzle openings and ejecting a gaseous mixture of oxygen gas and an inert gas in a mixing ratio in the range from 0.05 to 1.0 by volume from a nozzle opening which is between the above mentioned two nozzle openings in the concentric arrangement of the nozzle openings.

DETAILED DESCRIPTION OF THE PREFERRED EMBODIMENTS

As is described above, the most characteristic feature of the improvement of the invention consists in the supply of a gaseous mixture of an inert gas and oxygen gas from a nozzle opening of a concentric multiplex-tube burner nozzle, the nozzle being between the nozzle openings for the ejection of, one, for the gaseous mixture of the silicon-containing starting gas for the glass and oxygen and, the other, of hydrogen gas. This unique method according to the invention has been established as a result of the extensive investigations undertaken by the inventors with an object to develop an improved method for the flame hydrolysis of a silicon-containing gas using a concentric multiplex-tube burner nozzle which is free from the troubles due to deposition of fine silica particles on the nozzle end to cause blocking of the nozzle openings without unduly increasing the linear velocity of the gas ejection out of the nozzle openings so as to enable long-term continuous running of preform preparation with stability by the outer-deposition CVD method or VAD method.

The concentric multiplex-tube burner nozzle used in practicing the invention has five nozzle openings including a center nozzle opening, which is-referred to as the first nozzle opening hereinafter, and four ring-wise nozzle openings, hereinafter referred to as the second to the fifth nozzle openings from inside, disposed in a concentric arrangement. In a conventional using manner of such a fivefold concentric multiplex-tube burner nozzle, the first nozzle opening serves for the ejection of a gaseous mixture of the silicon-containing starting gas for glass and oxygen gas and the third and the fifth nozzle openings serve for the ejection of hydrogen gas and oxygen gas, respectively, while an inert gas is ejected from the second and the fourth nozzle openings. The improvement according to the present invention is obtained by ejecting, in place of a pure inert gas, a gaseous mixture of an inert gas and oxygen gas from the second nozzle opening which is intermediate between the first nozzle opening for the ejection of a mixture of the silicon-containing starting gas and oxygen and the third nozzle opening for the hydrogen gas.

The inert gas used here is not particularly limitative and can be any of conventionally used ones including nitrogen, argon, helium, neon, krypton and xenon, of which argon is preferred. In the method according to the invention, the gas ejected from the second nozzle opening is not a pure inert gas or pure argon gas but is a mixture of an inert gas and oxygen gas. The mixing ratio of oxygen gas to the inert gas should be in the range from 0.05 to 1.0 by volume since, when the gaseous mixture is too lean of the oxygen gas, the desired preventing effect against silica particle deposition on the nozzle end cannot be fully exhibited while, when the gaseous mixture is too rich relative to the content of oxygen, the nozzle end is overheated to red heat eventually to cause damage of the nozzle end. The linear flow velocity of the ejected gas out of the second nozzle opening is also important in order to exhibit the preventing effect against silica particle deposition on the nozzle end. In this regard, the linear flow velocity of the gas ejection from the second nozzle opening should be at least 0.3 meter/second.

Using a particular fivefold concentric multiplex-tube burner nozzle as an example, test running was conducted with varied feed rate of the silicon-containing starting gas for glass. When the feed rate of the silicon-containing starting gas exceeded 23 g/minute and the linear flow velocity of ejection of the gas, which was pure argon gas, from the second nozzle opening was 1.2 meters/second, deposition of silica particles took place on the nozzle end while silica particle deposition on the nozzle end could be prevented by increasing the linear flow velocity of the argon gas ejected from the second nozzle opening to 7.0 meters/second or higher even when the feed rate of the silicon-containing gas was 32 g/minute. On the other hand, silica particle deposition on the nozzle end could be completely prevented even when the feed rate of the silicon-containing gas was 32 g/minute or larger by replacing the argon gas ejected from the second nozzle opening with a mixture of oxygen and argon in a mixing ratio of 0.05:1 to 1:1 by volume which was ejected at a linear flow velocity of 1.2 meters/second.

In the following, the improvement according to the invention is described in more detail by way of examples and comparative examples.

EXAMPLES 1 TO 4.

A gaseous mixture of silicon tetrachloride and oxygen was ejected from the first nozzle opening, i.e. the center nozzle opening, of a fivefold concentric multiplex-tube burner of fused silica glass at a rate corresponding to 32 g/minute for the silicon tetrachloride and 10 liters/minute for the oxygen gas. Concurrently, hydrogen gas and oxygen gas were ejected from the third and fifth nozzle openings, respectively, each at a rate of 60 liters/minute to form an oxyhydrogen flame and argon gas was ejected from the fourth nozzle opening at a rate of 2 liters/minute. Also concurrently, a mixture of oxygen gas and argon gas in a varied mixing ratio of (5 liters/minute):(7 liters/minute),( 1 liter/minute):(5 liters/minute), (0.5 liter/minute):(1.5 liters/minute) or (0.1 liter/minute):(1.9 liters/minute), respectively, was ejected from the second nozzle opening. The linear flow velocities of the oxygen:argon gaseous mixture in these four test runs were 7.0, 4.6, 1.2 and 1.2 meters/second, respectively, at the second nozzle opening.

The burner under burning in the above described manner was reciprocatingly moved back and forth along the axial direction of a rod-formed substrate of fused silica glass having a diameter of 30 mm and a length of 900 mm in a reaction chamber so as to cause deposition of the fine silica particles formed by the flame hydrolysis of silicon tetrachloride on the substrate surface in the form of a porous silica body. The porous silica body obtained after 40 hours of running in this manner, which had a diameter of 150 mm and a length of 1000 mm, was subjected to a heat treatment at 1450° C. in an electric furnace and sintered and vitrified to give a transparent silica glass preform for optical fibers having a diameter of 88 mm and a length of 935 mm.

The burner nozzle demounted from the reaction chamber after completion of the run was inspected for the damage of the nozzle end by overheating and deposition of silica particles. The results were quite satisfactory in each of the four runs absolutely without damages of and silica deposition on the nozzle end irrespective of the mixing ratio of oxygen and argon and linear flow velocity of the mixed gas.

COMPARATIVE EXAMPLES 1 TO 4.

Four comparative test runs were undertaken in Comparative Examples 1 to 4 each in substantially the same manner as in the above described Examples except that the feed rate of silicon tetrachloride to the first nozzle opening was 32, 27, 32 or 32 g/minutes, respectively, and the gas ejected from the second nozzle opening at a rate of 2 liters/minute was argon alone in Comparative Examples 1 and 2 and oxygen alone or a 1.1:0.9 by volume mixture of oxygen and argon in Comparative Examples 3 and 4, respectively. The linear flow velocity of these gases at the second nozzle opening was 1.2 meters/second in each run. The condition of the nozzle end after 40 hours of continued running was that deposition of silica particles was found in Comparative Examples 1 and 2 though without damage of the nozzle end by overheating while damage of the nozzle end by overheating was found in Comparative Examples 3 and 4 though without deposition of silica particles.

What is claimed is:

1. In a method for the preparation of a glassy preform of optical fibers comprising the steps of combustion of a silicon-containing starting gas in an oxyhydrogen flame formed from hydrogen gas and oxygen gas by using a multiplex-tube burner nozzle having five concentrically arranged nozzle openings to effect flame hydrolysis of the silicon-containing starting gas in the oxyhydrogen flame to form fine silica particles, deposition of the fine silica particles on a substrate to form a porous silica body and vitrification of the porous silica body by heating into a transparent glassy preform of optical fibers, an improvement which comprises ejecting a gaseous mixture of the silicon-containing starting gas and oxygen gas from one of the nozzle openings, ejecting hydrogen gas from another of the nozzle openings and ejecting a gaseous mixture of oxygen gas and an inert gas in a mixing ratio in the range from 0.05 to 1.0 by volume from a nozzle opening, which is between the two nozzle openings for ejection of the gaseous mixture of the silicon-containing starting gas and oxygen gas and for ejection of hydrogen gas, in the concentric arrangement of the nozzle openings.

2. The improvement according to claim 1 in which the inert gas is argon.

3. The improvement according to claim 1 in which the linear flow velocity of the gaseous mixture of oxygen gas and an inert gas at the nozzle opening is at least 0.3 meter/second.

4. The improvement according to claim 1 in which the nozzle opening from which the gaseous mixture of the silicon-containing starting gas and oxygen gas is ejected is the center nozzle opening of the multiplex-nozzle burner having five concentrically arranged nozzle openings.

* * * * *